(No Model.)
C. C. & H. B. WARREN.
DYNAMO ELECTRIC MACHINE.
No. 562,868. Patented June 30, 1896.
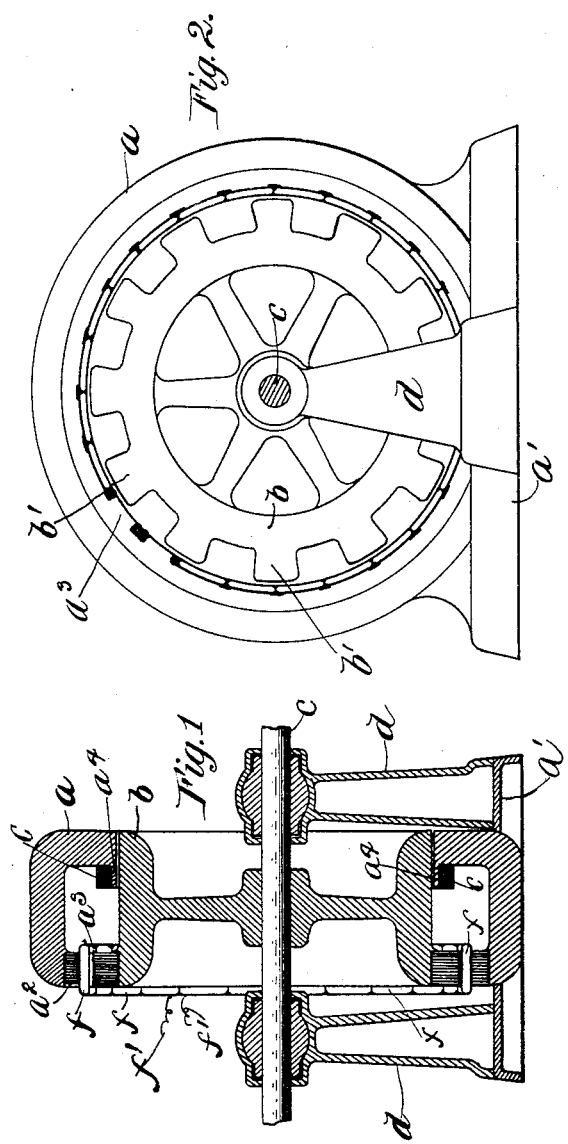
Witnesses:
De Witt C. Tanner
John W. Sinclair
Inventors
Charles C. Warren
Halbert B. Warren
By Barton + Brown
Attorneys.

UNITED STATES PATENT OFFICE.

CHARLES C. WARREN AND HALBERT B. WARREN, OF CHICAGO, ILLINOIS.

DYNAMO-ELECTRIC MACHINE.

SPECIFICATION forming part of Letters Patent No. 562,868, dated June 30, 1896.

Application filed January 31, 1896. Serial No. 577,528. (No model.)

*To all whom it may concern:*

Be it known that we, CHARLES C. WARREN and HALBERT B. WARREN, citizens of the United States, residing at Chicago, in the county of Cook and State of Illinois, have invented a certain new and useful Improvement in Dynamo-Electric Machines, (Case No. 1,) of which the following is a full, clear, concise, and exact description, reference being had to the accompanying drawings, forming a part of this specification.

Our invention relates to a dynamo-electric machine of the inductor type, the object of our invention being to provide a machine of extreme simplicity in construction, and one that shall operate with maximum efficiency.

In order that a dynamo-electric machine may be cheaply constructed and operated, there should be but few parts, and these such as can be easily formed, and the cast portions should be such that they may be readily cast. Furthermore, the parts should be so arranged and proportioned that they may be readily assembled, and so that parts may be easily removed in making repairs. For the efficient operation of the machine it is essential that the magnetic circuit offer as little reluctance as possible, and for this reason there should be no joints in the circuit and the air-gaps should be as small as possible. Furthermore, it is desirable that the construction be such that the armature-coils and the field coil or coils may be wound independently, and, when completed, placed in position upon the machine, and it is desirable that the field-coils and the armature-coils remain at rest instead of being rotated.

With the above objects in view, our invention comprises a dynamo-electric machine, the field-core of which is in the form of a hollow ring or annulus, a single magnetizing-coil being provided, which is situated within the hollow ring. The outer portion of the ring is mounted upon a standard and is stationary, while the inner portion of the ring is mounted upon a shaft and constitutes the revoluble rotor or inductor. The armature-coils are mounted upon the stationary portion of the machine and the rotor is provided with teeth or projecting portions, which move opposite the armature-coils, the flux or magnetic flow threading the coils being thus varied to induce currents in the coils. The projections upon the rotor and also the portion of the stationary core which is opposed to the projections are made of laminated iron, whereby the production of eddy-currents is prevented. The field or magnetizing coil comprises one or more circular coils, which are of such diameter that they may be placed within the annular field-core and may be supported upon a shelf provided for that purpose. The field coil or coils may thus be wound independently and afterward placed in position during the assembling of the machine. The machine, as thus arranged, may be cheaply constructed, as the movable and stationary portions of the field-core are simple in form and may be easily cast. The laminated rings may be readily placed in position, and the armature-coils and the field-coil may be independently formed and placed upon the machine, while in the operation of the machine the magnetic reluctance is a minimum, due to the extremely short length and the great cross-section of the magnetic core. Furthermore, the only moving portion of the machine is the mass of metal comprising the rotor or inductor.

We will describe our invention in connection with the accompanying drawings, in which—

Figure 1 is a sectional view of the machine of our invention. Fig. 2 is a view thereof in elevation.

Like letters refer to like parts in the two figures.

The machine comprises a yoke $a$, mounted stationarily upon a base $a'$, and a rotor or inductor $b$, mounted upon the shaft $c$, which is journaled to rotate in bearings $d\ d$. The rotor $b$ rotates within the yoke $a$, and the two constitute a hollow annular field-core. The magnetizing coil or coils are situated within the annular ring or field-core and are supported upon a shelf $h^4$. Laminated armature-rings $a^2$ are mounted upon a yoke $a$, extending inward, and are provided with projections $a^3$, about which the armature-coils $f\ f$ are placed, the armature-coils thus remaining stationary during the operation of the machine. The rotor $b$ is provided with projections $b'\ b'$, which are also formed of laminated material, mounted upon the inductor and moving opposite the armature-coils $ff$. As the rotor revolves and the projections $b'b'$ pass in front of the armature-coils, the magnetic flux therethrough is varied and an electromotive force is induced in said coils $ff$.

The armature-coils $ff$ may be operated singly or connected in series, in parallel, in series parallel, or a combination of these methods, and the ends $f'f'$ thereof connected to any desired form of circuit-terminals. The magnetizing-coil $c$ may be located at any position within the hollow ring or annulus, but we preferably arrange it in the position illustrated, as it may then be formed separately and placed in position. Likewise the air-gaps may be provided in any desired position, but we preferably arrange them as illustrated.

The machine as illustrated and built for commercial use shows an entirely new and original disposition of metal at one of the air-gaps. It will be noticed that laminated metal is placed upon each side of the air-gap which is interposed between the armature-rings $a^2$ and rotor projections $b'b'$. Laminated metal at this place is necessary on account of the constant rise and fall of flux in each position of the armature $a$, and on account of the whipping, swaying, and surface travel of flux in the rotor projections $b'b'$. It will be further noticed that the material at both sides of the air-gap which is interposed between the smooth end of the rotor $b$ and the yoke $a$ is of said cast metal, and not laminated at either side of the air-gap. Notwithstanding the fact that the metal upon one side of this latter air-gap is stationary, and that the opposed metal is rapidly revolved, and that there is an intense field of force existent between the two masses of cast metal, we have found that there is no objectionable heating of either mass of metal due to the development of Foucault or eddy currents. The absence of Foucault or eddy currents at the latter air-gap, through which is projected an intense magnetic field, is due to the well-known fact that no electromotive force is produced in a given number of elements unless there is a variable factor. Thus, with a constant value of flux and an unvarying rate of travel through the flux, the length of the conductor must be varied to create an electromotive force; or, with a uniform rate of travel and an unchanging length of conductor, the amount of flux threaded must vary to develop an electromotive force; or, with a constant value of flux encountered and a uniform length of conductor presented, the rate of travel must vary to produce an electromotive force. Theoretical considerations lead us to believe that at the air-gap between the smooth end of rotor $b$ and yoke $a$ there is no variable factor, for the flux, speed, and length of conductor are all constant, and that there should be no heating in either mass of metal from Foucault or eddy currents. Practice in commercial machines has demonstrated the correctness of this theory. At least two air-gaps are necessary in all dynamo-electric machines and in all others laminated metal is absolutely necessary in at least one face of each air-gap, and in many machines the use of laminated metal has been found desirable on each side of both air-gaps. In our machine laminated metal is required in but one locality, namely, upon each side of one of the air-gaps. This is of great advantage from a constructional standpoint, on account of simplicity, cheapness of cost, and durability of machine. The non-laminated air-gap may be located anywhere back of the necessarily-laminated portions of the machine, but we preferably locate it as illustrated.

Having described our invention, what we claim as new, and desire to secure by Letters Patent, is—

In a dynamo-electric machine, the combination of a stationary and a rotatable element of magnetic material constituting a field-core in the form of a hollow ring or annulus, armature-coils disposed upon said core with a magnetizing-coil secured within the interior of said ring or annulus, and a shelf projecting from the interior wall of said hollow ring or annulus adapted to support said magnetizing-coil and upon which said coil may be readily placed as a whole, substantially as described.

In witness whereof we hereunto subscribe our names this 25th day of November, A. D. 1895.

CHARLES C. WARREN.
   HALBERT B. WARREN.

Witnesses to the signature of Charles C. Warren:
  CHARLES A. BROWN,
  W. CLYDE JONES.

Witnesses to the signature of Halbert B. Warren:
  VIRGINIA M. CLOUGH,
  FRANCES CLOUGH.